T. LARSSON.
ELEVATOR VALVE MECHANISM.
APPLICATION FILED OCT. 12, 1904. RENEWED JUNE 9, 1913.
1,082,882. Patented Dec. 30, 1913.
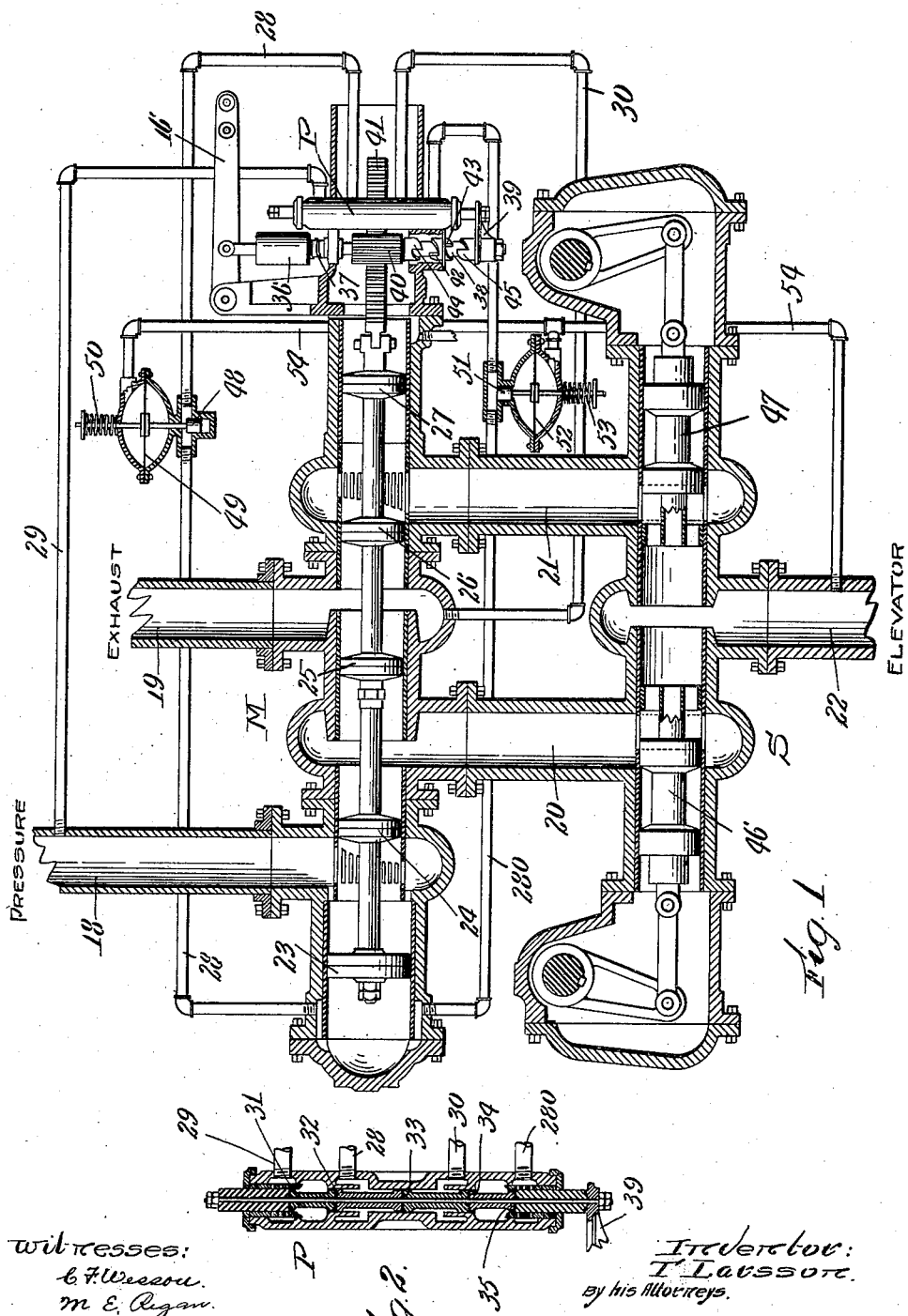

UNITED STATES PATENT OFFICE.

THURE LARSSON, OF WORCESTER, MASSACHUSETTS, ASSIGNOR TO HIMSELF, WILLIAM E. D. STOKES, OF NEW YORK, N. Y., AND FRED A. JONES, OF WORCESTER, MASSACHUSETTS.

ELEVATOR-VALVE MECHANISM.

1,082,882.          Specification of Letters Patent.     Patented Dec. 30, 1913.

Application filed October 12, 1904, Serial No. 228,163. Renewed June 9, 1913. Serial No. 772,691.

*To all whom it may concern:*

Be it known that I, THURE LARSSON, a subject of the King of Sweden, residing at Worcester, in the county of Worcester and State of Massachusetts, have invented a new and useful Elevator-Valve Mechanism, of which the following is a specification.

The object of this invention is to provide an improved valve mechanism for hydraulic elevators by which it will be impossible for the operator to stop the motion of the elevator quickly when going up with a light load, or when coming down with a heavy load. If an elevator is stopped quickly going up with a light load, the same is apt to "bound"; that is, the plunger is apt to leave the water in the cylinder, and then fall back, which bounding action is apt to cause derangement. If an elevator is stopped quickly when coming down with a heavy load, violent strain or water hammer is put upon the valves, which is apt to cause breakage or derangement. In the accompanying drawing I have shown a valve apparatus for hydraulic elevators arranged so as to obviate these difficulties.

In said drawing, Figure 1 is a sectional elevation of the valve mechanism, and Fig. 2 is a sectional elevation on an enlarged scale of the pilot valve mechanism.

Referring to the drawing and in detail, M designates the main valve; P the pilot valve; and S the double automatic or shut-off valve of a hydraulic elevator valve mechanism. A pressure pipe 18 and an exhaust pipe 19 are connected to the main valve, which latter is connected to the shut-off valve by two pipes 20 and 21. The shut-off valve connects to the elevator cylinder by pipe 22. On the main valve stem is arranged a piston 23, which with its cylinder constitutes a power motor for the main valve, a valve 24 controlling the supply, an intermediate piston 25, a valve 26 controlling the exhaust, and a piston 27, so that when the main valve is moved to the left, pressure will flow through pipe 18, connection 20 and pipe 22 to the elevator cylinder, and so that when the main valve is moved to the right, the elevator cylinder will exhaust through pipe 22, connection 21 and pipe 19. The piston 23 is larger than the other pistons and valves. The left-hand end of the main valve is connected by to-and-fro pipes 28 and 280 to the pilot valve P. The pressure pipe is connected to the pilot valve by pipe 29, and the exhaust pipe is connected to the pilot valve by a pipe 30.

The pilot valve is made up of valves 31 and 32, an intermediate piston 33, and valves 34 and 35, valves 32 and 34 being used as an additional means to prevent leakage when the pilot valve is in central position. These parts are arranged so that when the pilot valve is lowered, valves 34 and 35 are opened to connect the lower to-and-fro pipe 280 to the exhaust pipe 30, and hence, to relieve the pressure at the left of the piston 23 to cause the main valve to move to the left, and so that when the pilot valve is raised, valves 31 and 32 are opened to allow connection between the upper to-and-fro pipe 28 and the pressure pipe 29, to admit pressure on said piston 23 and to cause the main valve to move to the right. An operating lever 16 is connected to a nut 36 which engages a screw 37 on the end of a rod 38 fitted to slide and turn in the casing. The end of the rod 38 is connected by an arm 39 to the stem of the pilot valve. Said rod also carries a wide faced pinion 40, engaging which is a rack 41 extending from the main valve-stem. These parts are arranged so that when the pilot valve is moved down to cause the main valve to move to the left, said rack 41 will turn said pinion 40 and will cause the screw 37 to run into the nut 36 and thus to move and restore the pilot valve to its central or normal position, and so that when the pilot valve is moved up to cause a movement of the main valve to the right, said screw will be unscrewed from the nut 36 and the pilot valve restored to normal or central position. The screw 37 and the pinion 40 can move axially to allow the pilot valve to be moved from the operating lever 16, the pinion 40 being made wide faced for this purpose. It will also be noted that by means of this arrangement, whatever movement is given to the pilot valve will be proportionately given to the main valve, and that this movement of the main valve restores the pilot valve to central position. This forms a compact and efficient pilot valve mechanism. The rod 38 extends out through a part rigidly secured to the casing which has on its inner side a screw-cam or helix 42, and on its outer face another screw-cam or helix 43. Rigidly secured to the rod 38 is a helix 44 arranged to face the helix 42, and also a helix 45 arranged to face the helix 43. These helices are formed to have the same pitch as the screw 37 and are set as shown in the drawings. This arrangement is used so as to prevent a careless operator on the car violently reversing the motion of the car.

The shut-off valve S consists of two valves, one 46 arranged between the pipes 20 and 22 to control the pressure, and the other 47 between the pipe 21 and pipe 22 to control the exhaust. The valves are substantially rights and lefts, the right hand valve being used to check and stop the car at the limit of its downward run, and the left hand valve to check and stop the car at the limit of its upward run. The shut-off valves are operated by suitable connections so that the left-hand one will operate as the car reaches the top of its run, and so that the right-hand one will operate as the car reaches the limits of its downward run.

The mechanism before described is one of an improved type which is now being successfully installed.

In the upper to-and-fro pipe 28 is arranged a choking or throttle valve 48 which is controlled by a diaphragm arranged in a suitable valve casing; a suitable adjustable spring 50 being arranged on the stem of the valve 48 and tending normally to hold said valve 48 up to throttle the flow in said pipe 28. A throttle valve 51 is also arranged in the lower to-and-fro pipe 280 and is actuated and controlled by a diaphragm 52; an adjustable spring 53 being arranged to keep said throttle valve 51 normally in open position. Pressure is carried from pipe 22 by a pipe 54 to the top of the diaphragm 49 and to the lower side of the diaphragm 52. The tension of the springs 50 and 53 is adjusted so that the valves 48 and 51 will allow a predetermined flow through the to-and-fro pipes 28 and 280 for a normal or for a selected load. With a load which is lighter than the normal or selected load, throttle valve 48 will move to choke the flow in pipe 28, and throttle valve 51 will move to allow a larger or unrestricted flow through the pipe 280. This position of the parts is shown in the drawing. With a heavy load on the car the valves will move oppositely; that is to say, the valve 48 will move to allow a larger or unrestricted flow through the pipe 28, and the valve 51 will move to throttle the flow in the pipe 280. By this arrangement with a light load; that is with the parts shown in the position in the drawings, a quick action of the main valve will be obtained going up as pipe 280 is clear, and a slow action of the main valve in stopping on the upward movement will be obtained as the pipe 28 is choked. Going down with a light load, a slow action of the main valve will be obtained on the start as the pipe 28 is choked, and a quick action of the main valve will be obtained on the stop as the pipe 280 is clear. With a heavy load the conditions of operation are reversed; that is, a slow action of the main valve will be obtained starting up as the pipe 280 is now choked, and a quick action of the main valve will be obtained in stopping as the pipe 28 is opened. Going down with a heavy load a quick start will be obtained as pipe 28 is clear, and a slow stop will be obtained as pipe 280 is choked. By the throttling action of the valves 48 and 51 the rate of movement of the main valve for these operations will be proportioned to the load; the terms "quick" and "slow" previously mentioned being used, of course, relatively to the action with the normal or selected load. By this arrangement a slow stopping action will be obtained going up with a light load, and a quick stopping action coming down with a light load; while a quick stopping action will be obtained when going up with a heavy load, and a slow stopping action coming down with a heavy load. Thus the proper conditions of stopping are provided for.

Wherever I have referred to a pipe, of course, any other form of conductor can be used.

The details and mechanisms herein described may be varied by a skilled mechanic without departing from the scope of my invention as expressed in the claims.

Having thus fully described my invention, what I claim and desire to secure by Letters Patent is:—

1. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for choking the conductor connected with the pressure pipe at the start of the descent with a light load.

2. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for freeing the conductor connected with the exhaust at the start of the ascent with a light load.

3. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for freeing the conductor connected with the exhaust pipe at the stop of the descent with a light load.

4. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for choking the conductor connected with the pressure pipe at the stop of the ascent with a light load.

5. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for choking the conductor connected with the exhaust at the start of the ascent with a heavy load.

6. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for freeing the conductor connected with the pressure pipe at the stop of the ascent with a heavy load.

7. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for freeing the conductor connected with the pressure pipe at the stop of the ascent with a heavy load.

8. The combination in a starting and stopping device for an elevator having a power cylinder, of a main valve, a power motor for the main valve having a piston, two conductors entering the power motor at the same side of the piston, one connected with the pressure pipe and the other with the exhaust pipe of the elevator operating means, a pilot valve connected with said conductors and means connected with the power cylinder of the elevator operating mechanism and controlled by the pressure therein for choking the conductor connected with the exhaust at the stop of the descent with a heavy load.

9. The combination with a starting and stopping device for an elevator having a power cylinder, of a conductor connected with the power cylinder, valves operated by the pressure therein, and means controlled by said valves for securing a slow action at the start of the descent with a light load, and a quick action at the stop thereof, said means comprising a main valve, a power motor for operating the main valve, two conductors communicating with said power motor, and a pilot valve for connecting one of said two conductors with and disconnecting it from the pressure, and the other with and from the exhaust.

10. The combination with a starting and stopping device for an elevator having a power cylinder, of a conductor connected with the power cylinder, valves operated by the pressure therein, and means controlled by said valves for securing a quick action at the start of the ascent with a light load, and a slow action at the stop thereof, said means comprising a main valve, a power motor for operating the main valve, two conductors communicating with said power motor, and a pilot valve for connecting one of said two conductors with and disconnecting it from the pressure, and the other with and from the exhaust.

11. The combination with a starting and stopping device for an elevator having a power cylinder, of a conductor connected with the power cylinder, valves operated by the pressure therein, and means controlled by said valves for securing a slow action at the start of the ascent with a heavy load, and a quick action at the stop thereof, said means comprising a main valve, a power motor for operating the main valve, two conductors communicating with said power motor, and a pilot valve for connecting one of said two conductors with and disconnecting it from the pressure, and the other with and from the exhaust.

12. The combination with a starting and stopping device for an elevator having a power cylinder, of a conductor connected with the power cylinder, valves operated by the pressure therein, and means controlled by said valves for securing a quick action at the start of the descent with a heavy load, and a slow action at the stop thereof, said means comprising a main valve, a power motor for operating the main valve, two conductors communicating with said power motor, and a pilot valve for connecting one of said two conductors with and disconnecting it from the pressure, and the other with and from the exhaust.

13. The combination with a starting and stopping device for an elevator having a power cylinder, of a conductor connected with the power cylinder, diaphragms connected with said conductor controlled by the pressure therein, valves operated by said diaphragms, and means controlled by said valves for securing a slow action at the start of the descent with a light load, and a quick action at the stop thereof, and a quick action at the start of the ascent, and a slow action at the stop of the ascent.

14. The combination with a starting and stopping device for an elevator having a power cylinder, of a conductor connected with the power cwylinder, diaphragms connected with said conductor controlled by the pressure therein, valves operated by said diaphragms, and means controlled by said valves for securing a slow action at the start of the ascent with a heavy load, a quick action at the stop of the ascent, a quick action at the start of the descent with a heavy load, and a slow action at the stop of the descent.

15. The combination with a starting and stopping device for an elevator having a power cylinder, of a conductor connected with the power cylinder, diaphragms connected with said conductor controlled by the pressure therein, valves operated by said diaphgrams, and means controlled by said valves for securing a slow action at the start of the descent with a light load, and a quick action at the stop, a quick action at the stop of the ascent with a heavy load, a slow action at the start of the ascent, and a quick action at the start of the ascent with a light load, and a slow action at the stop.

16. The combination in a starting and stopping device for an elevator having a power cylinder, of a main valve, a power motor for the main valve having a piston, two conductors entering the power motor at the same side of the piston, one connected with the pressure pipe, and the other with the exhaust pipe of the elevator operating means, means for choking the conductor connected with the pressure pipe at the start of the descent with a light load, and means for freeing the other tube upon the stop thereof.

17. The combination in a starting and stopping device for an elevator having a power cylinder, of a main valve, a power motor for the main valve having a piston, two conductors entering the power motor at the same side of the piston, one connected with the pressure pipe, and the other with the exhaust pipe of the elevator operating means, means for freeing the conductor connected with the exhaust at the start of the ascent with a light load, and means for choking the other tube at the stop.

18. The combination in a starting and stopping device for an elevator having a power cylinder, of a main valve. a power motor for the main valve having a piston, two conductors entering the power motor at the same side of the piston, one connected with the pressure pipe, and the other with the exhaust pipe of the elevator operating means, means for choking the conductor connected with the exhaust at the start of the ascent with a heavy load, and means for freeing the other tube at the stop.

19. The combination in a starting and stopping device for an elevator having a power cylinder, of a main valve, a power motor for the main valve having a piston, two conductors entering the power motor at the same side of the piston, one connected with the pressure pipe, and the other with the exhaust pipe of the elevator operating means, means for freeing the conductor connected with the pressure pipe at the start of the descent with a heavy load, and means for choking the other tube at the stop.

20. The combination of a starting and stopping device for an elevator motor, and controlling means for regulating the rate of movement of the starting and stopping device constructed and arranged so that the same will have a quick starting and slow stopping action on an upward movement of the car with a light load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

21. The combination of a starting and stopping device for an elevator motor, and controlling means for regulating the rate of movement of the starting and stopping device constructed and arranged so that the same will have a slow starting and quick stopping action on an upward movement of the car with a heavy load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

22. The combination of a starting and stopping device for an elevator motor, and controlling means for regulating the rate of movement of the starting and stopping device constructed and arranged so that the same will have a quick starting and slow stopping action on an upward movement of the car with a light load and so that the same will have a slow starting and quick stopping action on an upward movement of the car with a heavy load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

23. The combination of a starting and stopping device for an elevator motor and controlling means for regulating the rate of movement of the starting and stopping device constructed and arranged so that the same will have a quick starting and slow stopping action on a downward movement of the car with a heavy load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

24. The combination of a starting and stopping device for an elevator motor, and controlling means for regulating the rate of movement of the starting and stopping device constructed and arranged so that the same will have a slow starting and quick stopping action on a downward movement of the car with a light load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

25. The combination of a starting and stopping device for an elevator motor, and controlling means for regulating the rate of movement of the starting and stopping device constructed and arranged so that the same will have a quick starting and slow stopping action on a downward movement of the car with a heavy load and a slow starting and quick stopping action on a downward movement of the car with a light load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

26. The combination of a starting and stopping device for an elevator motor, and controlling means for regulating the rate of movement of the starting and stopping device constructed and arranged so that the same will have a slow starting and quick stopping action on an upward movement of the car with a heavy load; so that the same will have a quick starting and slow stopping action on an upward movement of the car with a light load; so that the same will have a quick starting and slow stopping action on a downward movement of the car with a heavy load; and so that the same will have a slow starting and quick stopping action on a downward movement of the car with a light load, said starting and stopping device comprising a main valve casing, pressure and exhaust pipes connected therewith, a main valve in said casing, a power motor connected with said casing and having a piston connected with the main valve for operating it, two conductors communicating with said power motor, and a pilot valve for connecting one of said conductors with and disconnecting it from said pressure pipe, and the other with and from said exhaust pipe.

27. The combination of a starting and stopping device for an elevator motor, motor means for the starting and stopping device, a valve mechanism for the motor means, and means for controlling the flow between the valve mechanism and motor means adjusted by the load of the car constructed and arranged so that the flow will be under opposite conditions in starting and in stopping, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

28. The combination of a starting and stopping device for an elevator motor, motor means for the starting and stopping device, valve mechanism for the motor means, and means for controlling the flow between the valve mechanism and the motor means constructed and arranged so that the starting and stopping device will have a quick starting and slow stopping action on an upward movement of the car with a light load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

29. The combination of a starting and stopping device for an elevator motor, motor means for the starting and stopping device, valve mechanism for the motor means, and means for controlling the flow between the valve mechanism and the motor means constructed and arranged so that the starting and stopping device will have a slow starting and quick stopping action on an upward movement of the car with a heavy load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

30. The combination of a starting and stopping device for an elevator motor, motor means for the starting and stopping device, valve mechanism for the motor means, and means for controlling the flow between the valve mechanism and the motor means constructed and arranged so that the starting and stopping device will have a quick starting and slow stopping action on an upward movement of the car with a light load, and so that the starting and stopping device will have a slow starting and quick stopping action on an upward movement of the car with a heavy load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

31. The combination of a starting and stopping device for an elevator motor, motor means for the starting and stopping device, valve mechanism for the motor means, and means for controlling the flow between the valve mechanism and the motor means constructed and arranged so that the starting and stopping device will have a quick starting and slow stopping action on a downward movement of the car with a heavy load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

32. The combination of a starting and stopping device for an elevator motor, motor means for the starting and stopping device, valve mechanism for the motor means, and means for controlling the flow between the valve mechanism and the motor means constructed and arranged so that the starting and stopping device will have a slow starting and quick stopping action on a downward movement of the car with a light load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

33. The combination of a starting and stopping device for an elevator motor, motor means for the starting and stopping device, valve mechanism for the motor means, and means for controlling the flow between the valve mechanism and the motor means constructed and arranged so that the starting and stopping device will have a quick starting and slow stopping action on a downward movement of the car with a heavy load, and a slow starting and quick stopping action on a downward movement of the car with a light load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

34. The combination of a starting and stopping device for an elevator motor, motor means for the starting and stopping device, valve mechanism for the motor means, and means for controlling the flow between the valve mechanism and the motor means constructed and arranged so that the starting and stopping device will have a quick starting and slow stopping action on an upward movement of the car with a light load, a slow starting and quick stopping action on an upward movement of the car with a heavy load, a quick starting and slow stopping action on a downward movement of the car with a heavy load, and a slow starting and quick stopping action on a downward movement of the car with a light load, said starting and stopping device comprising a main valve casing, pressure and exhaust pipes connected therewith, a main valve in said casing, said motor means being connected with said casing and having a piston connected with the main valve for operating it, and two conductors communicating with said motor means, said valve mechanism for the motor means connecting one of said conductors with and disconnecting it from said pressure pipe, and the other with and from said exhaust pipe.

35. The combination with an elevator having a power cylinder and a plunger therein on which the car is mounted, of a starting and stopping device therefor comprising a main valve casing, pressure and exhaust pipes connected with the interior of said casing, a main valve in said casing, a power motor connected with said casing and having a piston therein connected with the main valve for operating it, two conductors communicating with said power motor, and a pilot valve for connecting one of said conductors with and disconnecting it from said pressure pipe, and the other with and from said exhaust pipe.

36. The combination with an elevator having a power cylinder and a plunger therein on which the car is mounted, of a starting and stopping device therefor comprising a main valve casing, pressure and exhaust pipes connected with the interior of said casing, a main valve in said casing, a power motor connected with said casing and having a piston therein connected with the main valve for operating it, two conductors communicating with said power motor, a pilot valve for connecting one of said conductors with and disconnecting it from said pressure pipe, and the other with and from said exhaust pipe, two valves for controlling said two conductors, a conductor connected with the power cylinder, and means communicating with the last named conductor for operating said valves.

37. The combination with an elevator having a power cylinder and a plunger therein on which the car is mounted, of a starting and stopping device therefor comprising a main valve casing, pressure and exhaust pipes connected with the interior of said casing, a main valve in said casing, a power motor connected with said casing and having a piston therein connected with the main valve for operating it, two conductors communicating with said power motor, a pilot valve for connecting one of said conductors with and disconnecting it from said pressure pipe, and the other with and from said exhaust pipe, two valves for controlling said two conductors, a conductor connected with the power cylinder, and means communicating with the last named conductor for operating said valves to simultaneously choke one conductor and free the other.

In testimony whereof I have hereunto set my hand, in the presence of two subscribing witnesses.

THURE LARSSON.

Witnesses:
 LOUIS W. SOUTHGATE,
 MARY E. REGAN.

---

Copies of this patent may be obtained for five cents each, by addressing the "Commissioner of Patents, Washington, D. C."